United States Patent Office 3,790,442
Patented Feb. 5, 1974

3,790,442
BINDERS FOR GLASS FIBER INSULATION
Ronald James Ashall, Wigan, England, assignor to Fibreglass Limited, Liverpool, Lancashire, England
No Drawing Filed Dec. 15, 1971, Ser. No. 208,400
Claims priority, application Great Britain, Dec. 19, 1970, 60,195/70; Jan. 29, 1971, 3,475/71; July 13, 1971, 32,877/71
Int. Cl. C08g 37/08; C08h 15/00
U.S. Cl. 161—198          11 Claims

ABSTRACT OF THE DISCLOSURE

A binder composition for bonding together glass fibers comprises a resin of a phenol formaldehyde polymer and two setting modifying additives, namely urea and either calcium, magnesium or ammonium lignosulfonate so that by controlling the amount of urea relative to the lignosulfonate added to form the binder a desired setting time can be achieved.

FIELD OF THE INVENTION

This invention concerns improvements in or relating to binders for a glass fiber insulation, and to glass fiber products using such binders.

BACKGROUND OF THE INVENTION

In the production of glass fiber products, such as products used for insulation purposes, it is common practice to bond glass fibers with a binder during their formation into the product. In one particular process glass fibers are sprayed with a binder as they fall through a hood on to a moving conveyor on which they form a mat. With such a process the setting time of the binder is an important factor. If the setting time is too short, the binder may become partially set before it has been compressed up to its final density. If, on the other hand, the setting time is too long, there is a tendency for the mat to contain "green patches," i.e. patches where the binder has not set satisfactorily.

One form of binder used is based on a phenolformaldehyde resin which is normally mixed with a suitable extender, which should preferably help to improve the binding properties of the composition. We have now found that by a suitable choice of the components forming the binder, we can control the gel or setting time of the binder. In addition, the binder composition of the invention is found to have a greater efficiency, that is the percentage of binder retained on the glass fibers after cure is increased. This is believed to be due to a reduction in the loss of low molecular weight material during application and cure of the binder. We have found that urea can be used to increase the setting time of the binder, and a lignosulfonate tends to shorten the setting time. The addition of urea to binder compositions for glass fibers has been described, but the combination of urea with a lignosulfonate provides a control over gel setting time previously unobtainable. The use of these relatively cheap extenders not only enables the setting time to be controlled, but the cost of the binder and the amount of phenol required in the binder to be reduced. The reduction in phenol content enables a binder to be used which enables the problem of removing phenol from the plant effluent to be diminished.

The term "lignosulfonate" is used to refer to a material produced as a by-product in the digestion of wood pulp. During this digestion with an inorganic bisulfite lignosulfonates are formed, and some of the hemi-cellulose is converted to hydrocarbons. The liquor formed may be sprayed dried to give a solid material, or concentrated to a liquor of a particular solids concentration. The lignosulfonate in liquor form is also known as a treated waste sulfite liquor. Lignosulfonates are readily available in the form of solids or a liquor, and we have found it feasible to use material derived from processes involving the use of calcium, magnesium and ammonium bisulfite in the pulping process. The resulting lignosulfonate materials are comparable in performance in the binders of this invention.

SUMMARY OF THE INVENTION

According to the invention, there is provided a binder composition for use with glass fibers which comprises a phenol-formaldehyde polymer, as the resin in the binder, urea and a lignosulfonate chosen from calcium, magnesium and ammonium lignosulfonates, the relative proportions of urea and lignosulfonates being chosen so as to impart a desired setting time to the binder, and being chosen so that the bonding solids content ratio (as hereinafter defined) is the range 0.15 to 0.260.

The invention further comprehends a glass fiber product comprising glass fibers coated with a binder set forth in this specification, and a method of producing such a product which includes coating glass fibers with such a binder.

The bonding solids content ratio is the ratio of the solids content ratio." A variation in the value of this ratio sulfonate to the solids in the binder due to the resin present and any additional urea. The examples show in detail how to culculate this ratio, and therefore assist in defining what is meant by the use of the term "bonding solids content ratio." A variation in the valve of this ratio enables the phenol content of the binder to be varied. We find for example that at a value of 0.19 the amount of phenol present is 34%, and at a value of 0.157, the amount of phenol is 47%. The solids content ratio value of 0.157 can e.g. be obtained using a resin at 15% solids content, plus 5% by weight of urea and 15% by weight of the lignosulfonate. A solids content ratio as high as 0.260 would be obtained using the resin, plus 15% by weight urea, and 20% by weight of the lignosulfonate.

The results obtained with comparative rod adhesion tests show that there is little difference in performance between the various types of lignosulfonate used in the binders of the present invention. This test was carried out using a binder containing on a solids basis: resin—74%; urea—10%; lignosulfonate—16%.

Binder glass adhesion

A 12% binder mix is first prepared. This is the standard mix for evaluation of resins.

The bushing is switched on, and the drum is set rotating at 3000 r.p.m. The temperature of the bushing is allowed to rise to such an extent that the diameter of the fiber is equal to 0.004" (keeping the glass level in the bushing constant). The fiber is then drawn over a pad onto the drum and each rod (3000 fibers) is run for 1 minute. The pad is kept moist by spooning the resin mix onto it. For each binder mix 10 rods are run. The rods are taken off the drum, dipped in the binder mix and then left to drip for an hour. The rods are then cured in an oven at 220° C. for 5 minutes. They are then divided into two, one-half is reversed and then cut into two halves. One-half is tested to find the breaking strengths of the rods. 15 readings are taken, and the average is noted. The other half of the rods are put into a humidity cabinet for 1 hour. The temperature of the cabinet is 50° C. and a tray in the bottom of the cabinet contains a saturated solution of potassium sulfate. The breaking strength of these rods is then determined, again 15 readings are taken, and the average is noted. The percent difference between the two breaking strengths is known as the percent weathering loss. The figures obtained are only comparative, but it can be seen from the table below that they are all of the same order.

| Type of lignosulfonate: | As made (grams) | After humidity (grams) | Percent loss |
|---|---|---|---|
| Ammonium | 528 | 510 | 3 |
| Magnesium | 582 | 547 | 6 |
| Calcium | 541 | 529 | 2 |

Method of determining gel time used in the examples below

The gel time was determined using the following:

(1) A thermostatically controlled hot plate set at 150° C. (310° F.).
(2) A surgical syringe capable of dispensing 2 cc. of binder at 15% solids concentration.
(3) A wooden handled spatula tapering to ¼" at the tip.
(4) A stop watch.

Before making tests, resins and binders are adjusted to pH 6. A 2 cc. sample of binder is run to the center of the hot plate from the syringe. The stop watch is started immediately when the sample contacts the hot plate. The binder is held in the center of the hot plate by using the spatula. After the bulk of the diluent water has evaporated, the spatula is moved in an up and down motion using the flat tip of the spatula in contact with the heated residue. The gel time is when the residue commences to string. The time is noted by the stop watch, and three tests are run for each resin, the average being the gel time.

EXAMPLE I

This example in addition to illustrating a binder composition according to the invention also illustrates the method used in calculating the solids content ratio.

A polymer resin for use in a binder according to the invention was prepared as follows using the following mole ratio of reactants.

1 mol phenol:2.7 mols formaldehyde:1 mol urea:0.005 mol Carbowax 600 (a Union Carbide Co. trade name for a polyethylene glycol mwt. 600):0.045 mol barium hydroxide In making up a batch of resin, the following quantities of reactants were used:

| Phenol | gallons | 230 |
|---|---|---|
| Formaldehyde, 37% w./w. | do | 500 |
| Urea | lb | 1530 |
| Polyethylene glycol (Carbowax 600) | lb | 78 |
| Barium hydroxide pentahydrate | lb | 300 |
| Sulfuric acid, specific gravity 1.25 | gallons | 22 |

The reaction cycle is as follows:

The catalyst is added to the phenol formaldehyde mixture. The reaction proceeds at 115° F., pH 8.5–9, for two hours. The temperature is raised to 145° F. for two hours. The polyethylene glycol is added. The temperature is raised to 165° F. and held for one to one and a quarter hours. The urea is added over a quarter hour period and reacted to 165° F. for a further thirty minutes. The resin is cooled at 100° F. and neutralized to pH 7.2 with sulfuric acid.

This resin can be used in making up binder formulations while varying solids content ratio in the range of 0.150 to 0.260.

A binder solution was made up using the following quantities of ingredients and, as resin, material prepared as described above:

| | | | |
|---|---|---|---|
| Polymer resin (prepared as above, specific gravity 1.19 to 48% solids) | 45 gallons | 260 | 540 |
| Ammonia solution, specific gravity 0.88 | 3 gallons | | 26 |
| Ammonium sulfate solution, 16.7% w./w. | 1 gallon | 1.67 | 10 |
| A1120 silane additive | 5 ounces | 0.31 | 0.31 |
| Kiton orange dye | 1 lb | 1.0 | 1.0 |
| Totanin (ammonium lignosulfonate) | 52 lbs | 52 | 52 |
| Urea | 35 lbs | 35 | 35 |
| Emulsified oil, specific gravity 0.9, 40% w./w. | 10 gallons | 36 | 90 |
| Make up water | 217 gallons | | |

Column A represents the quantity of material used, column B the solids content in lbs., and column C the bulk content in lbs. Column B gives a total effective solids of 383 lbs. (i.e. excluding ammonium sulfate, silane and dye) and column C 2020 lbs. (including the water). The total bonding solids content can then be calculated neglecting the emulsified oil content of 36 lbs., hence 36 lbs. are subtracted from 384.

∴ Percent total bonding solids content $$=\frac{383-36}{2920}\times 100 = 12\%$$

Urea extender content $=\frac{35}{383-36}\times 100 = 10\%$

Ammonium lignosulfonate content $$=\frac{52}{383-36}\times 100 = 15\%$$

To calculate the bonding solids content ratio of the solids content ammonium lignosulfonate to the solids content phenol, fomraldehyde and urea, the inert material formed from the catalyst is neglected as it does not enter into the bonding action. In the present example, 260 lbs. of resin will contain 15 lbs. barium sulfate, so we determine the bonding solids content ratio in the following manner:

Bonding solids content ratio $$=\frac{52 \text{ (due to ammonium lignosulfonate)}}{260 \text{ (resin)} - 15 \text{ catalyst)} + 35 \text{ (urea)}}$$

$$=\frac{52}{280}=0.19$$

The bonding solids content ratio of solids content ammonium lignosulfonate to solids content of phenol, formaldehyde and urea was 0.19. This binder gave a gel time of 186 seconds. The gel time being measured by the hot plate test described below.

EXAMPLE II

A polymer resin was prepared in which the molar ratios of the reactants were as follows: Phenol 1; formaldehyde 2.5; urea 1; Ba(OH)$_2$ 0.045. Barium hydroxide is present as a catalyst.

30.6 gallons of formaldehyde (37% concentration), 15 gallons phenol, 100 lbs. urea (in powder form) and 19.7 lbs. Ba(OH)$_2$5H$_2$O were placed in a stirred reactor pot. The temperature of the reactants was increased to 115° F., while stirring, and the temperature was then held for 2 hours at 115° F., when it was increased to 137° F. for a further two hours, and finally to 155° F. for one hour. The resin was then cooled to 100° F. and neutralized to pH 7.2 by addition H$_2$SO$_4$SG 1.25.

The resin thus obtained was used in the formation of a binder by mixing it with urea and an ammonium lignosulfonate known by the trade name "Totanin."

(I) Effect of lignosulfonate to shorten gel time

Polymer resin only, 4 minutes
Polymer resin+10% Totanin, 2 minutes 55 seconds
Polymer resin+12% Totanin, 2 minutes 43 seconds
Polymer resin+15% Totanin, 2 minutes 36 seconds (II) Effect of urea/lignosulfonate to control gel time and to match a target gel time of 3 minutes 30 seconds Polymer resin only (a different sample from above), 4 minutes 40 seconds
Polymer resin+10% Totanin, 5% urea, 3 minutes 35 seconds

EXAMPLE III

Effect on gel time of urea to extend and urea lignosulfonate to control gel time Resin alone, 2 minutes 33 seconds
Resin+30% urea, 4 minutes 10 seconds
Resin+18% urea+12% Totanin, 3 minutes
Resin+20% urea+10% Totanin, 3 minutes 28 seconds The resin incorporated into the binder mixture was prepared as in Example II except that the molar ratios of the reactants were phenol 1, formaldehyde 3.1, dicyandiamide 0.11, urea 0.23, barium hydroxide 0.068.

EXAMPLE IV

A resin prepared in the same manner as described in Example III was used in forming the binder. Calcium lignosulfonate was supplied under the description calcium lye by A/S Toten Cellulosefabrik, Nygard St., Oslo, Norway.

The binder gel times obtained using varying proportions of urea and calcium lignosulfonate with the above resin in a binder formulation were as follows:

7½% urea+ 13% calcium lignosulfonate at 12% binder solids, 182 seconds
5% urea+15% calcium lignosulfonate at 12% binder solids, 173 seconds
10% urea+15% calcium lignosulfonate at 12% binder solids, 207 seconds
20% calcium lignosulfonate at 15% binder solids, 123 seconds
5% urea+20% lignosulfonate at 15% binder solids, 133 seconds
10% urea+20% lignosulfonate at 15% binder solids, 150 seconds
10% calcium lignosulfonate at 15% binder solids, 201 seconds
15% calcium lignosulfonate at 15% binder solids, 168 seconds
5% urea+10% calcium lignosulfonate at 15% binder solids, 231 seconds
5% urea+15% calcium lignosulfonate at 15% binder solids, 185 seconds

EXAMPLE V

The binder gel times obtained using varying proportions of urea and calcium lignosulfonate with a phenol formaldehyde resin were as follows:

27½% urea+5% calcium lignosulfonate at 15% binder solids, 258 seconds
27½% urea+10% calcium lignosulfonate at 15% binder solids, 233 seconds
27½% urea+15% calcium lignosulfonate at 15% binder solids, 208 seconds

EXAMPLE VI

A resin prepared in the same manner as described in Example II was used in forming a series of binder compositions in which the effect of varying the amounts of urea and magnesium lignosulfonate (as a 60% solids liquor) on the gel time. The binder was made so as to have a 15% solids content, and the bonding solids content ratio was chosen to be in the range 0.15 to 0.260. The results obtained are shown in the table below. The times given in the table are in seconds, the percentages represent percentages by weight based on 100% as the weight of bonding solids i.e. where urea is e.g. 5% and lignosulfonate 20%, the resin content of the bonding solids will be 75%.

| Urea, percent | 0 | 5 | 10 |
|---|---|---|---|
| Magnesium lignosulfonate: | | | |
| 0 | 171 | 194 | 226 |
| 5 | 151 | 179 | 194 |
| 10 | 118 | 150 | 161 |
| 15 | 84 | 126 | 131 |

EXAMPLE VII

A series of rod adhesion tests were carried out using the resin prepared as in Example II and using a magnesium lignosulfonate as in Example VI. The results obtained are given in the table below.

| Preparation | | | Rod adhesion | | |
|---|---|---|---|---|---|
| Resin | Urea, percent | Magnesium, lignosulfonate percent | As made (grams) | after humidity (grams) | Percent loss |
| Example | | | 549 | 507 | 8 |
| Do | 5 | | 501 | 478 | 5 |
| Do | 10 | | 535 | 517 | 3 |
| Do | | 5 | 556 | 534 | 4 |
| Do | 5 | 5 | 521 | 515 | 1 |
| Do | 10 | 5 | 522 | 491 | 6 |
| Do | | 10 | 564 | 533 | 5 |
| Do | 5 | 10 | 515 | 472 | 8 |
| Do | 10 | 10 | 497 | 443 | 11 |
| Do | | 15 | 490 | 485 | 1 |
| Do | 5 | 15 | 531 | 507 | 5 |
| Do | 10 | 15 | 475 | 405 | 15 |

EXAMPLE VIII

Tests were carried out in the same manner as in Example III except that the resin used was a simple phenol-formaldehyde resin prepared as follows:

1 mole phenol:2.05 moles formaldehyde
0.045 mole barium hydroxide pentahydrate.

In making up a batch of resin the following quantities of reactants were used:

Phenol _____gallons__ 168
Formaldehyde, 37% w./w. _____do____ 284
Barium hydroxide pentahydrate _____lbs__ 230

A catalyst is added to the phenol formaldehyde mixture. The reaction proceeds at 110° F. pH 8.5 to 9 for two hours. The temperature is raised to 137° F. for two hours. The temperature is raised to 147° F. for one hour. The resin is cooled to 100° F. and neutralized to pH 7.2 with sulfuric acid.

What is claimed is:
1. A binder composition for use with glass fibers which comprises;
   (1) a phenol-formaldehyde polymer produced in the presence of barium hydroxide as a condensing agent as a resin in the binder,
   (2) urea as a binder setting modifying additive, and
   (3) a lignosulfonate chosen from calcium, magnesium, and ammonium lignosulfonates as a further binder setting modifying additive, the relative proportions of urea and lignosulfonate being chosen so as to impart a desired setting time to the binder.

2. A binder composition as claimed in claim 1, in which the resin is a phenol-formaldehyde-urea polymer.

3. A binder composition as claimed in claim 2 in which the mol ratio of the components of the reactants used in forming the resin is
   1 mol phenol:2.7 mols formaldehyde:1 mol urea:0.045 mol barium hydroxide being present as catalyst.

4. A binder composition as claimed in claim 3 in which the mol ratio of the reactants used in forming the resin is
  1 mol phenol:2.5 mols formaldehyde:1 mol urea:0.045 mol barium hydroxide being present as catalyst.

5. A binder composition as claimed in claim 1 in which the resin used in the binder is a phenol-formaldehyde-urea-dicyandiamide polymer.

6. A binder composition as claimed in claim 5 in which the mol ratio of the reactants used in forming the resin is
  1 mol phenol:3.4 mols formaldehyde:0.11 mol dicyandiamide:0.23 mol urea:0.068 mol of barium hydroxide being present as catalyst.

7. A binder composition as claimed in claim 1 in which a polyethylene glycol is added during the manufacture of the resin.

8. A binder composition as claimed in claim 1 in which the relative proportions of urea and ammonium lignosulfonate are chosen so that the ratio of the solids content due to ammonium lignosulfonate to the solids content due to the polymer and additional urea is in the range 0.15 to 0.260.

9. A binder composition as claimed in claim 5 in which the solids content ratio is 0.19.

10. A bonded product formed from glass fibers and a heat curable binder bonding the fibers together in a comparatively porous structure, in which the binder used is as claimed in claim 1.

11. A method of treating glass fibers in which a binder composition as claimed in claim 1 is applied to glass fibers to form a bonded product.

References Cited
UNITED STATES PATENTS

| | | | |
|---|---|---|---|
| 2,786,008 | 3/1957 | Herschler | 154—132 |
| 3,090,700 | 5/1963 | Ball et al. | 117—66 |
| 3,095,392 | 6/1963 | Herrick | 260—17.5 |
| 3,336,185 | 8/1967 | Helbing | 161—170 |
| 3,285,801 | 11/1966 | Sarjeant | 161—170 |

WILLIAM H. SHORT, Primary Examiner

E. A. NIELSEN, Assistant Examiner

U.S. Cl. X.R.

156—335; 161—170, Digest 4; 260—17.5